United States Patent
Mihara et al.

(10) Patent No.: US 8,667,300 B2
(45) Date of Patent: Mar. 4, 2014

(54) IMAGE PROCESSING APPARATUS AND METHOD

(75) Inventors: Isao Mihara, Tokyo (JP); Yasunobu Yamauchi, Kanagawa-ken (JP); Masahiro Sekine, Tokyo (JP); Yasukazu Higuchi, Kanagawa-ken (JP); Norihiro Nakamura, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1050 days.

(21) Appl. No.: 12/690,394

(22) Filed: Jan. 20, 2010

(65) Prior Publication Data

US 2010/0189255 A1 Jul. 29, 2010

(30) Foreign Application Priority Data

Jan. 23, 2009 (JP) .................. 2009-012966

(51) Int. Cl.
*G06F 11/30* (2006.01)
(52) U.S. Cl.
USPC ........... 713/189; 713/193; 380/201; 380/210; 348/208.4; 348/448; 345/536
(58) Field of Classification Search
USPC ........................................................ 713/189
See application file for complete search history.

(56) References Cited

U.S. PATENT DOCUMENTS

| | | | | |
|---|---|---|---|---|
| 6,718,122 | B1* | 4/2004 | Ishii et al. ................. | 386/328 |
| 2003/0011821 | A1* | 1/2003 | Obata et al. ............... | 358/1.16 |
| 2003/0095276 | A1* | 5/2003 | Hiramatsu et al. .......... | 358/1.14 |
| 2004/0105104 | A1* | 6/2004 | Ishikawa et al. ............ | 358/1.6 |
| 2004/0205213 | A1* | 10/2004 | Paz et al. ................... | 709/231 |
| 2006/0176520 | A1* | 8/2006 | Motomura et al. .......... | 358/451 |
| 2007/0188775 | A1* | 8/2007 | Minamino ................. | 358/1.6 |
| 2007/0258587 | A1* | 11/2007 | Harada et al. .............. | 380/201 |
| 2008/0068499 | A1* | 3/2008 | Mizuno ...................... | 348/448 |
| 2008/0072072 | A1* | 3/2008 | Muraki et al. ............. | 713/193 |
| 2008/0158364 | A1* | 7/2008 | Miyajima et al. .......... | 348/207.1 |
| 2008/0267597 | A1* | 10/2008 | Nakasato .................... | 386/131 |
| 2008/0284859 | A1* | 11/2008 | Lee ............................ | 348/208.1 |

(Continued)

FOREIGN PATENT DOCUMENTS

JP 2004-38966 2/2004

OTHER PUBLICATIONS

Chris Sells, et al., Programming WPF; Hello, WPF; Chapter 1, 2007, pp. 1-35.

*Primary Examiner* — Ashok Patel
*Assistant Examiner* — Gary Gracia
(74) *Attorney, Agent, or Firm* — Oblon, Spivak, McClelland, Maier & Neustadt, L.L.P.

(57) ABSTRACT

Encrypted video data is decrypted as first image data. If a first image processing module includes an output processing to an outside of a first secure memory which an access from an outside of an apparatus is restricted, the first image processing module is converted to a second image processing module including the output processing invalidated. The first image data is processed using the second image processing module, by accessing the first secure memory, and second image data is generated. If a first rendering module includes an output processing to an outside of a second secure memory which an access from the outside of the apparatus is restricted, the first rendering module is converted to a second rendering module including the output processing invalidated. The second image data is rendered using the second rendering module, by accessing the second secure memory.

12 Claims, 11 Drawing Sheets

(56) References Cited

U.S. PATENT DOCUMENTS

2008/0298469 A1* 12/2008 Liu et al. ................ 375/240.26
2009/0115858 A1* 5/2009 Lee ........................... 348/208.4
2010/0124284 A1* 5/2010 Lee et al. ................ 375/240.18
2010/0135489 A1* 6/2010 Ziesler ......................... 380/210

* cited by examiner

IMAGE PROCESSING APPARATUS AND METHOD

CROSS-REFERENCE TO RELATED APPLICATIONS

This application is based upon and claims the benefit of priority from Japanese Patent Application No. 2009-12966, filed on Jan. 23, 2009; the entire contents of which are incorporated herein by reference.

FIELD OF THE INVENTION

The present invention relates to an apparatus and a method for processing an image.

BACKGROUND OF THE INVENTION

Conventionally, a framework suitable for video processing (image processing), and a framework suitable for rendering processing (CG processing) individually exist. For example, in case of seamlessly processing a video on CG space (such as playing a video in CG space), it is necessary to combine these different frameworks.

Under this situation, in case of processing video data protected by copyright, even if a security of the video data in each framework is guaranteed (For example, referred to JP-A 2004-38966 (Kokai)), the security of the video data is often infringed by mutually sending/receiving data among frameworks. Accordingly, in case of processing video data protected by copyright, in order to guarantee a security in an area, the video data need to be processed in a facility to restrict access from the outside, i.e., a security protection facility.

Furthermore, recently, a new framework to merge the video processing and the CG processing exists (For example, referred to "Chris Sells and Ian Griffiths, "Programming WPF (2nd version)", Oreilly & Associates Inc., Aug. 15, 2007"). However, this framework does not prepare the security protection facility. Accordingly, in case of processing video data (protected by copyright) using the new framework, the video data need to be processed in the security protection facility.

Even if the video data is processed in the security protection facility, when an arbitrary processing module is used for the video processing or the rendering processing, the video data protected by copyright is often outputted to the outside of the security protection facility.

Accordingly, a processing module having security guaranteed is previously prepared in the security protection facility by a developer or a designer. The video processing or rendering processing needs to be executed using this processing module only. However, in this case, a kind of the processing module used for the video processing or the rendering processing is restricted. As a result, contents of the video processing or the rendering processing are also restricted.

SUMMARY OF THE INVENTION

The present invention is directed to an apparatus and a method for realizing various kinds of image processing while guaranteeing security of image data.

According to an aspect of the present invention, there is provided an apparatus for processing an image, comprising: a first acquisition unit configured to acquire encrypted video data; a decryption unit configured to decrypt the encrypted video data as first image data; a first secure memory configured to restrict, an access from an outside of the apparatus to the first secure memory; a first image processing module memory configured to store a first image processing module; a first converter configured to decide whether the first image processing module includes an output processing to an outside of the first secure memory, and, when the first image processing module includes the output processing, converts the first image processing module to a second image processing module including the output processing invalidated; a first processor configured to process the first image data using the second image processing module, by accessing the first secure memory, and generate second image data; a second secure memory configured to restrict, an access from the outside of the apparatus to the second secure memory; a first rendering module memory configured to store a first rendering module; a second converter configured to decide whether the first rendering module includes an output processing to an outside of the second secure memory, and, when the first rendering module includes the output processing, converts the first rendering module to a second rendering module including the output processing invalidated; a rendering unit configured to render the second image data using the second rendering module, by accessing the second secure memory; and a display unit configured to display the second image data rendered.

DETAILED DESCRIPTION OF THE EMBODIMENTS

Figure 1:
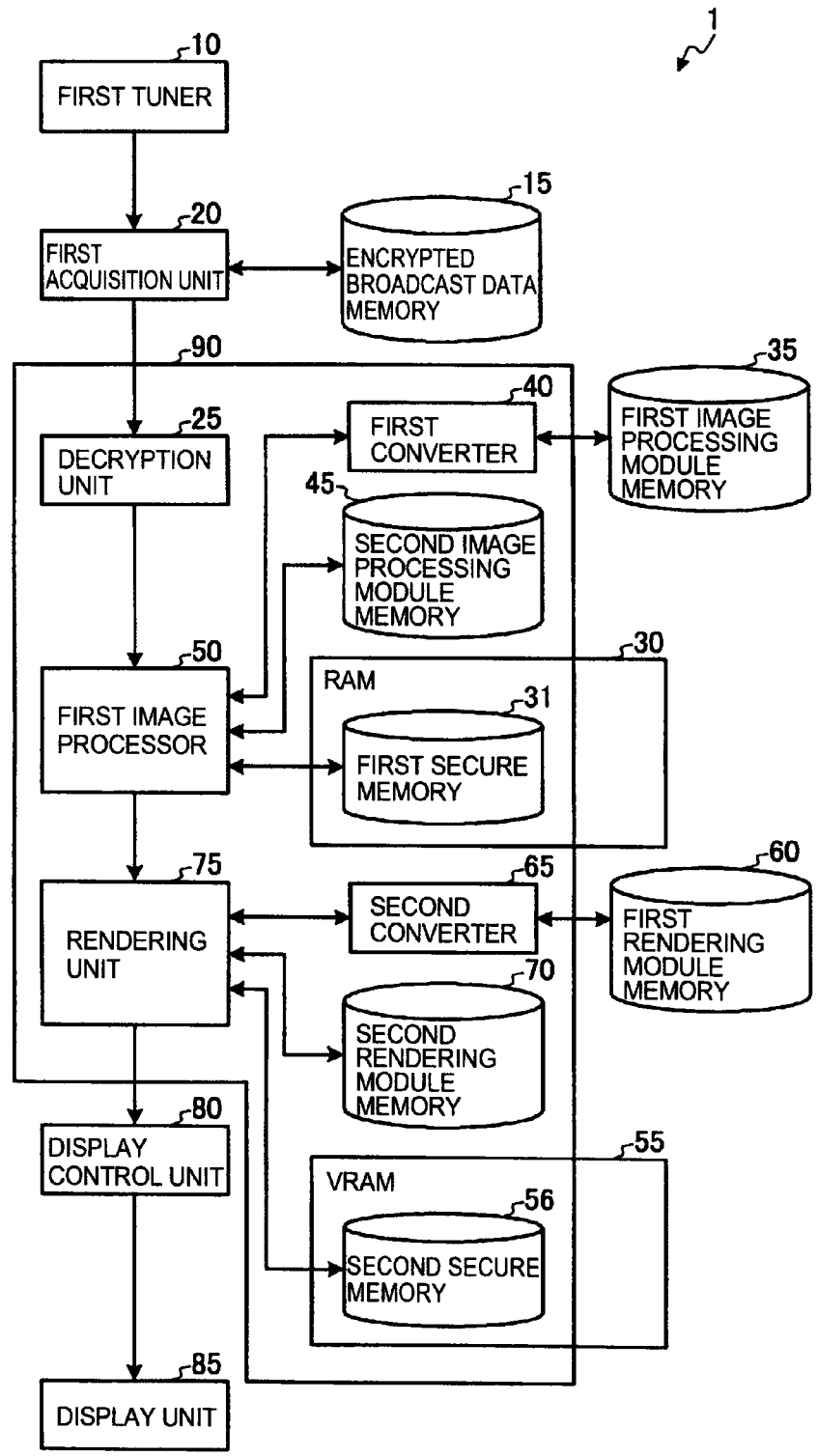
FIG. 1 is a block diagram of an image processing apparatus according to a first embodiment.

Hereinafter, embodiments of the present invention will be explained by referring to the drawings. The present invention is not limited to the following embodiments.

The First Embodiment

First, component of the image processing apparatus of the first embodiment is explained. FIG. 1 is a block diagram of component of the image processing apparatus 1 of the first embodiment. The image processing apparatus 1 includes a first tuner 10, an encrypted broadcast data memory 15, a first acquisition unit 10, a decryption unit 25, a RAM (Random Access Memory) 30, a first secure memory 31, a first image processing module memory 35, a first converter 40, a second image processing module memory 45, a first image processor 50, a VRAM (Video Random Access Memory) 55, a second secure memory 56, a first rendering module memory 60, a second converter 65, a second rendering module memory 70, a rendering unit 75, a display control unit 80, and a display unit 85.

In the image processing apparatus 1, a user's access to each function unit in an area 90 is restricted. Each action is the decryption unit 25, the first secure memory 31, the first converter 40, the second image processing module memory 45, the first image processor 50, the second secure memory 56, the second converter 65, the second rendering module memory 70, and the rendering unit 75.

Concretely, as to a storage region of each function unit in the area 90, access from the outside of the area 90 is restricted. As a result, the user's direct access to data stored in the first secure memory 31 and the second secure memory 56 is restricted. On the other hand, the function unit included in the area 90 can access data stored in the first secure memory 31 and the second secure memory 56. For example, this component can be realized using a "sandbox" facility.

In FIG. 1, the first tuner 10 receives an encrypted broadcast, and outputs the received broadcast as an encrypted video/sound signal. In this case, "the encrypted broadcast" is a broadcast provided by the conditional access system for reception, for the purpose of copyright-protection. For example, a digital terrestrial broadcasting, a BS digital broadcasting, a 110 CS digital broadcasting, or a broadcast distributed from Internet Protocol network using Next Generation Network technique, correspond. Briefly, "the encrypted broadcast" is a broadcast prescribed to restrict a user's (such as a viewer) access to original data (non-encrypted data) of the broadcast.

The encrypted broadcast data memory 15 stores a video/sound signal encrypted, in the broadcast received by the first tuner 10. The video/sound signal is already recorded by the image processing apparatus 1. The encrypted broadcast data memory 15 can be realized with an existing memory medium such as a HDD (Hard Disk Drive), an optical disk, or a memory card. Furthermore, as to the video/sound signal stored in the encrypted broadcast data memory 15, a DRM (Digital Rights Management) technique is used, and copy and reuse by the user (such as the viewer) are restricted.

The first acquisition unit 20 acquires encrypted video data (video signal) from the first tuner 10 or the encrypted broadcast data memory 15.

The decryption unit 25 decrypts the video data (acquired from the first acquisition unit 20) as a series of image data. Concretely, by using a decryption key prepared in the image processing apparatus 1, a decryption key provided from an external device (For example, B-CAS (registered trademark) card), or a decryption key downloaded via a network, the decryption unit 25 decrypts the video data. In this case, the video data is decoded as a format of image sequence which each frame of image data is aligned in time series (For example, bitmap, JPEG (Joint Photographic Experts Group)), or a format of motion image data (For example, AVI (Audio Video Interleaving), MPEG (Moving Picture Experts Group)).

The RAM 30 is used as a working region of various processing executed by the first image processor 50 (explained afterwards). Then the RAM 30 includes the first secure memory 31.

The first secure memory 31 is a part of a storage region of the RAM 30, which an access from the outside is restricted. In this case, "the access from the outside" is an access from the outside of the area 90 (explained before). An access from each function unit in the area 90 is permitted. The first secure memory 31 stores decrypted video data (by the decryption unit 25) as a series of image data. Image processing by the first image processor 50 (explained afterwards) is executed using the first secure memory 31. Furthermore, in the first secure memory 31, information (attribute such as color of each pixel) of image data of each frame comprising video data (decrypted by the decryption unit 25) and relationship among frames are managed.

The first image processing module memory 35 stores an image processing module used for various image processing by the first image processor 50 (explained afterwards). In the same way as the encrypted broadcast data memory 15, the first image processing module memory 35 can be realized as an existing memory device such as a HDD. For example, in the first image processing module memory 35, an image processing module for edge-sharpness processing to sharpen edge parts of the image, and an image processing module for high-resolution conversion to highly qualify the image, are stored.

In the first image processing module memory 35, in addition to an image processing module not including an output processing to the outside of the first secure memory 31 (non-inclusion of the output processing is guaranteed by a designer or developer of the image processing apparatus 1), an arbitrary image processing module is permitted to be registered because the first image processing module memory 35 is not included in the area 90.

In this case, various image processing can be realized using various kinds of the image processing modules stored in the first image processing module memory 35. However, the image processing module harming security (For example, image data stored in the first secure memory 31 is outputted to the outside of the area 90) may be often registered in the first image processing module memory 35. Accordingly, as to the first embodiment, the first converter 40 (explained afterwards) converts the image processing module harming security to a secure image processing module.

The first converter 40 reads an image processing module from the first image processing module memory 35, decides whether the image processing module includes an output processing to the outside of the first secure memory 31. If the image processing module includes the output processing, the first converter 40 converts the image processing module to an image processing module which the output processing is invalidated.

Concretely, as to the image processing module read from the first image processing module memory 35, the first converter 40 decides whether an address of an output destination of data from the image processing module is an address in the first secure memory 31. If the address of the output destination is not the address in the first secure memory 31 (For example, an address of the RAM 30 outside of the first secure memory 31), the first converter 40 decides that the image processing module includes the output processing to the outside of the first secure storage unit 31, and invalidates the output processing of the image processing module.

Furthermore, the first converter 40 decides whether the image processing module includes an output instruction (For example, an output instruction to a screen, an output instruction to an external memory, an output instruction to a file, an output instruction to a printer) to at least one of an output apparatus and a storage apparatus (excluding the RAM 30). If the image processing module includes the output instruction, the first converter 40 decides that the image processing module includes the output processing to the outside of the first secure memory 31, and invalidates the output processing of the image processing module.

Figure 2:
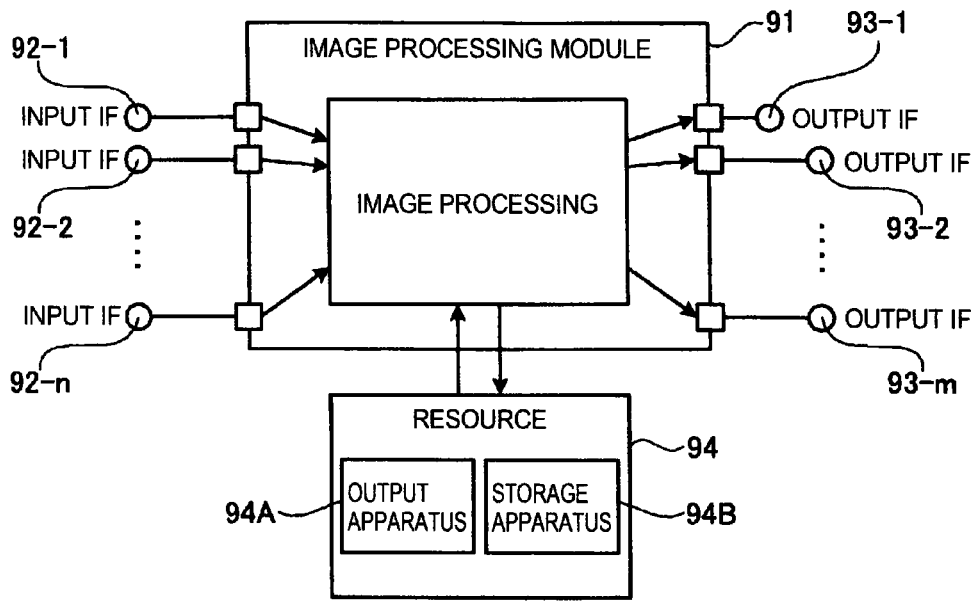
FIG. 2 is a schematic diagram of one example of an image processing module conceptualized.
Figure 3:
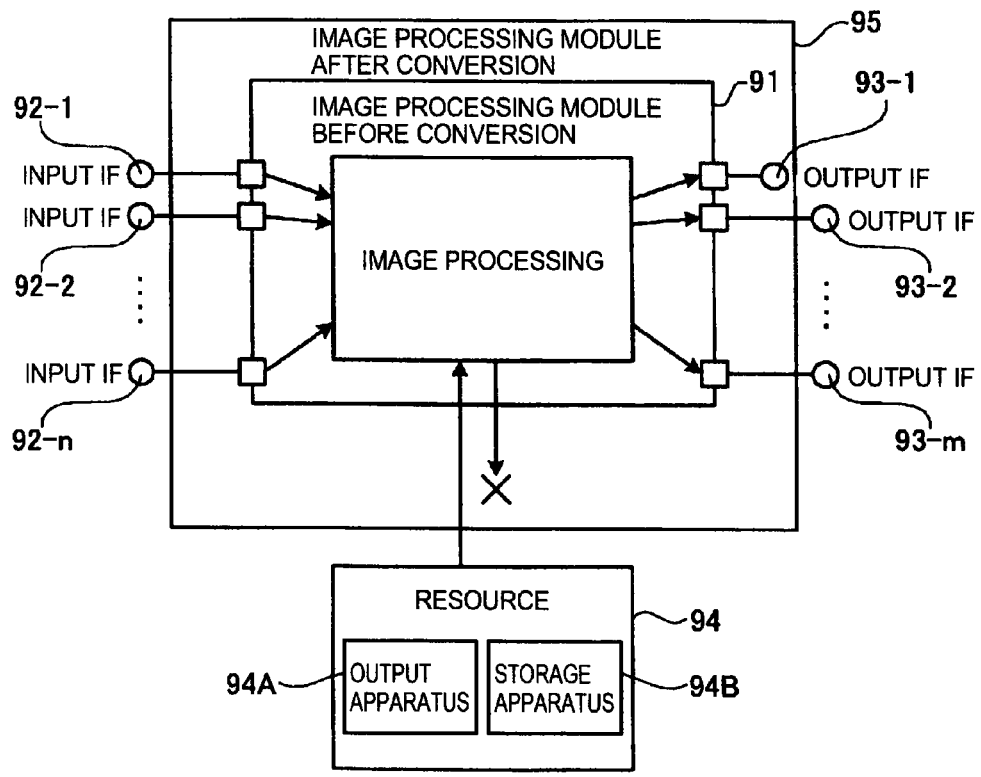
FIG. 3 is a schematic diagram of one example of conversion of the image processing module.

By referring to FIGS. 2 and 3, conversion of the image processing module by the first converter 40 is explained. FIG. 2 is a schematic diagram of one example of the image processing module conceptualized. FIG. 3 is a schematic diagram of one example of conversion of the image processing module. In FIGS. 2 and 3, an example that the image processing module is realized as a class library packaged with software is explained. In this case, the class library may be packaged with hardware.

As shown in FIG. 2, an image processing module 91 includes an input IF (Interface) 92-1~92-*n* (n≥1: n is integral number), and an output IF (Interface) 93-1~93-*m* (m≥1: m is integral number). As to data input from the input IF 92-1~92-*n*, the image processing module 91 executes a predetermined image processing, and outputs the processing result from the output IF 93-1~93-*m* to the RAM 30 or a resource 94 (a predetermined hardware such as an output apparatus 94A or a storage apparatus 94B). Actually, as explained afterwards, the first image processor 50 executes this processing using the image processing module 91.

For example, the output apparatus 94A is the display unit 85 or a printing apparatus (not shown in Fig.). The storage apparatus 94B is a HDD, an optical disk, or a memory card (each not shown in Fig.). In this case, the storage apparatus 94B does not include the RAM 30. Furthermore, in the image processing module 91, information of the input interface and the output interface, contents of a processing to be executed, and relationship between the input/output interface and the processing to be executed is stored.

The first converter 40 decides whether an address of an output destination of the processing result via the output IF 93-1~98-*m* is an address in the first secure memory 31. In this example, assume that the address of the output destination of the processing result via an output IF 93-1 is not the address in the first secure memory 31. Furthermore, the first converter 40 decides whether the image processing module 91 includes an output instruction to the resource 94. In this example, assume that the image processing module 91 includes the output instruction to the output apparatus 94A.

In this case, as shown in FIG. 3, the first converter 40 blocks an external open of the output IF 93-1 and blocks a sending path of the output instruction to the output apparatus 94A. Briefly, the image processing module 91 (before conversion) is converted to an image processing module 95. In the image, processing module 95 after conversion, data output via the output IF 93-1 and the output instruction to the output apparatus 94A are invalidated.

Figure 4:
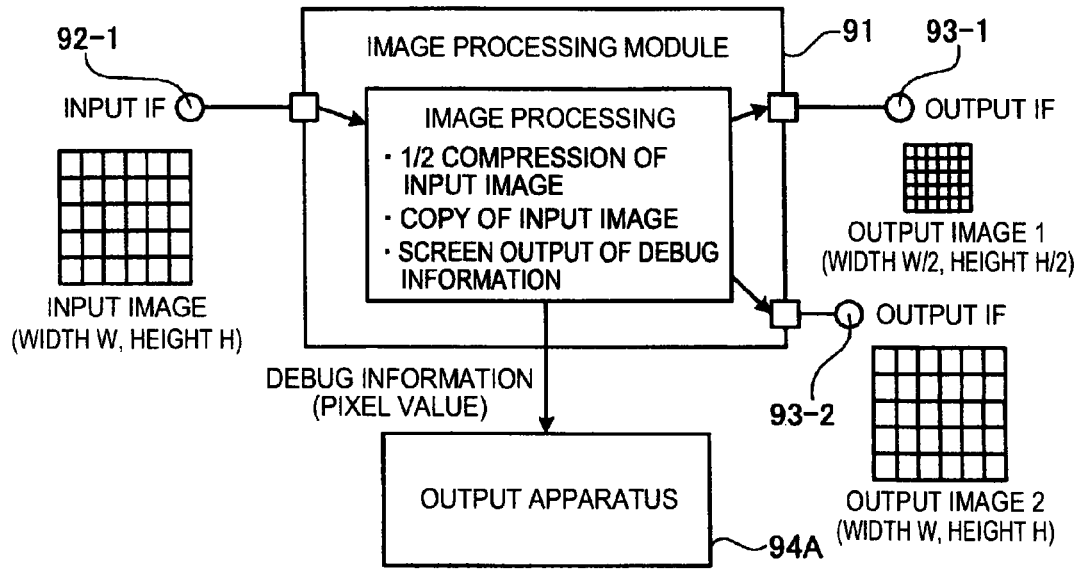
FIG. 4 is a schematic diagram of a concrete example of an image processing module.
Figure 5:
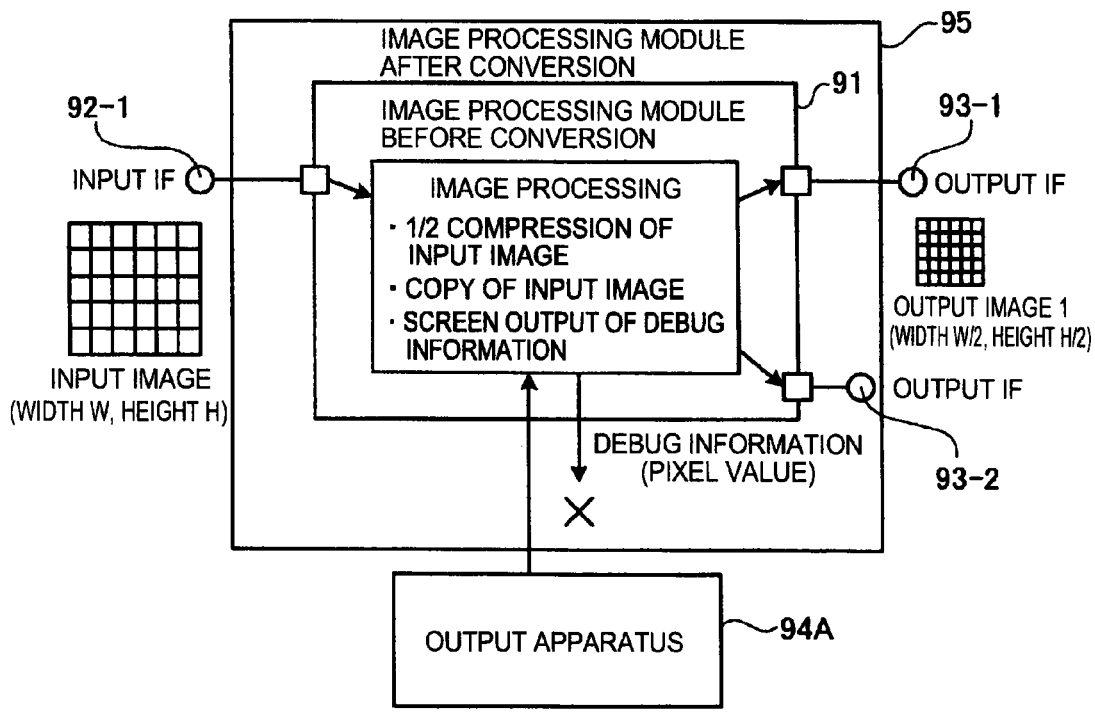
FIG. 5 is a schematic diagram of a concrete example of conversion of the image processing module.

Next, by applying a concrete image processing to the image processing module 91, conversion of the image processing module by the first converter 40 is explained in detail. FIG. 4 is a schematic diagram of one example of the image processing module to execute image processing (such as compression of image data). FIG. 5 is a schematic diagram of one example of conversion of the image processing module in FIG. 4.

In FIG. 4, as to an input image (width W, height H) via an input IF (Interface) 92-1, the image processing module 91 executes "½" compression processing, and outputs a compressed output image 1 (width W/2, height H/2) to the first secure memory 31 via an output IF 93-1. Furthermore, the image processing module 91 copies the input image, and outputs an output image 2 (width W, height H) to the RAM 30 outside the first secure memory 31 via an output IF 93-2. Furthermore, in order to monitor (debug) a value of arbitrary pixel during image processing, the image processing module 91 includes a screen output instruction of the pixel value to the output apparatus 94A.

In this way, in the image processing module 91, an address of an output destination of the output image 2 via the output IF 93-2 is not an address in the first secure memory 31, and the screen output instruction to the output apparatus 94A in included. Accordingly, as shown in FIG. 5, the first converter 40 blocks an external open of the output IF 93-2 and blocks a sending path of the screen output instruction to the output apparatus 94A. Briefly, the image processing module 91 (before conversion) is converted to the image processing module 95. In the image processing module 95 after conversion, an output of the output image 2 to the RAM 30 (outside of the first secure memory 31) via the output IF 93-2, and the screen output instruction to the output apparatus 94A, are invalidated. As a result, security of the image data is guaranteed.

Return to FIG. 1, in the second image processing module memory 45, a secure image processing module not including an output processing to the outside of the first secure memory 31 (non-inclusion of the output processing is guaranteed by a designer or developer of the image processing apparatus 1) is stored. The second image processing module memory 45 is realized as an existing memory medium such as a ROM (Read Only Memory) or a HDD.

Furthermore, registration of an arbitrary image processing module to the second image processing module memory 45 is not permitted, because the second image processing module memory 45 is included in the area 90. Briefly, the second image processing module memory 45 is used as a read-only database.

By using the image processing module converted by the first converter 40, the first image processor 50 executes image processing of image data (For example, a frame image at a predetermined time in decrypted image data) decrypted by the decryption unit 25, by accessing the first secure memory 31.

For example, in case of using an image processing module for edge-sharpness (converted by the first converter 40), as to image data decrypted by the decryption unit 25, the first image processor 50 executes image processing (such as a high-pass filter, or a sharpness-filter) to sharpen the edge part, by using the first secure memory 31.

Furthermore, the first image processor 50 reads a secure image processing module from the second image processing module memory 45, and executes image processing of the image data (decrypted by the decryption unit 25) using the secure image processing module, by accessing the first secure memory 31. In this case, the image processing module and the secure image processing module used by the first image processor 50 may be previously defined by a table, or selected by a user.

The VRAM 55 is used as a working region of various processing by the rendering unit 75 (explained afterwards). Furthermore, contents displayed on the display unit 85 (explained afterwards) are stored in the VRAM 55. The VRAM 55 includes the second secure memory 56.

The second secure memory 56 is apart of storage region of the VRAM 55, which an access from the outside is restricted. In this case, "the access from the outside" is an access from the outside of the area 90, and an access from each function unit in the area 90 is permitted.

As to image data processed by the first image processor 50, the rendering unit 75 executes rendering processing by accessing the second secure memory 56. In the first rendering module memory 60, a rendering module used for various rendering processing (CG (Computer Graphics) processing)

by the rendering unit 75 is stored. In the same way as the encrypted broadcast data memory 15, the first rendering module memory 60 is realized by an existing memory medium such as a HDD.

For example, in the first rendering module memory 60, a rendering module to render image data into a CG space (virtual three-dimensional space) is stored. In the same way as the first image processing module memory 35, in the first rendering module memory 60, in addition to the rendering module not including an output processing to the outside of the second secure memory 56 (non-inclusion of the output processing is guaranteed by a designer or developer of the image processing apparatus 1), an arbitrary rendering module is permitted to be registered because the first rendering module memory 60 is not included in the area 90.

The second converter 65 reads a rendering module from the first rendering module memory 60, decides whether the rendering module includes an output processing to the outside of the second secure memory 56. If the rendering module includes the output processing, the second converter 65 converts the rendering module to a rendering module which the output processing is invalidated.

Concretely, as to a rendering module read from the first rendering module memory 60, the second converter 65 decides whether an address of an output destination of data from the rendering module is an address in the second secure memory 56. If the address of the output destination is not the address in the second secure memory 56 (For example, an address of the VRAM 55 outside of the second secure memory 56), the second converter 65 decides that the rendering module includes the output processing to the outside of the second secure memory 56, and invalidates the output processing of the rendering module.

Furthermore, the second converter 65 decides whether the rendering module includes an output instruction (For example, an output instruction to a screen, an output instruction to an external memory, an output instruction to a file, an output instruction to a printer) to at least one of an output apparatus and a storage apparatus (excluding the VRAM 55). If the rendering module includes the output instruction, the second converter 65 decides that the rendering module includes the output processing to the outside of the second secure memory 56, and invalidates the output processing of the rendering module. Conversion of the rendering module by the second converter 65 is same as conversion of the image processing module by the first converter 40. Accordingly, detail explanation is omitted.

In the second rendering module memory 70, a secure rendering module not including an output processing to the outside of the second secure memory 56 (non-inclusion of the output processing is guaranteed by a designer or developer of the image processing apparatus 1) is stored. In the same way as the second image processing module memory 45, the second rendering module memory 70 is realized as an existing memory medium such as a ROM.

Furthermore, registration of an arbitrary registering module to the second rendering module memory 70 is not permitted, because the second rendering module memory 70 is included in the area 90. Briefly, in the same way as the second image processing module memory 45, the second rendering module memory 70 is used as a read-only database.

By using the rendering module converted by the second converter 65, the rendering unit 75 renders image data (processed by the first image processor 50) by accessing the second secure memory 56. For example, the rendering unit 75 is realized as a GPU (Graphics Processing Unit) or a software processing.

Furthermore, the rendering unit 75 reads a secure rendering module from the second rendering module memory 70, and renders the image data (processed by the first image processor 50) using the secure rendering module, by accessing the second secure memory 56.

Concretely, by using the rendering module converted by the second converter 65, the rendering unit 75 executes texture-mapping to a CG model (defined as polygon), and renders a texture on a surface of the CG model. In detail, the rendering unit 75 converts image data of each frame (processed by the first image processor 50) to a texture in order, and executes mapping the texture onto the surface of the CG model (For example, a polygon having a plate shape) in order. As a result, the video appears in the CG space.

Figure 6:
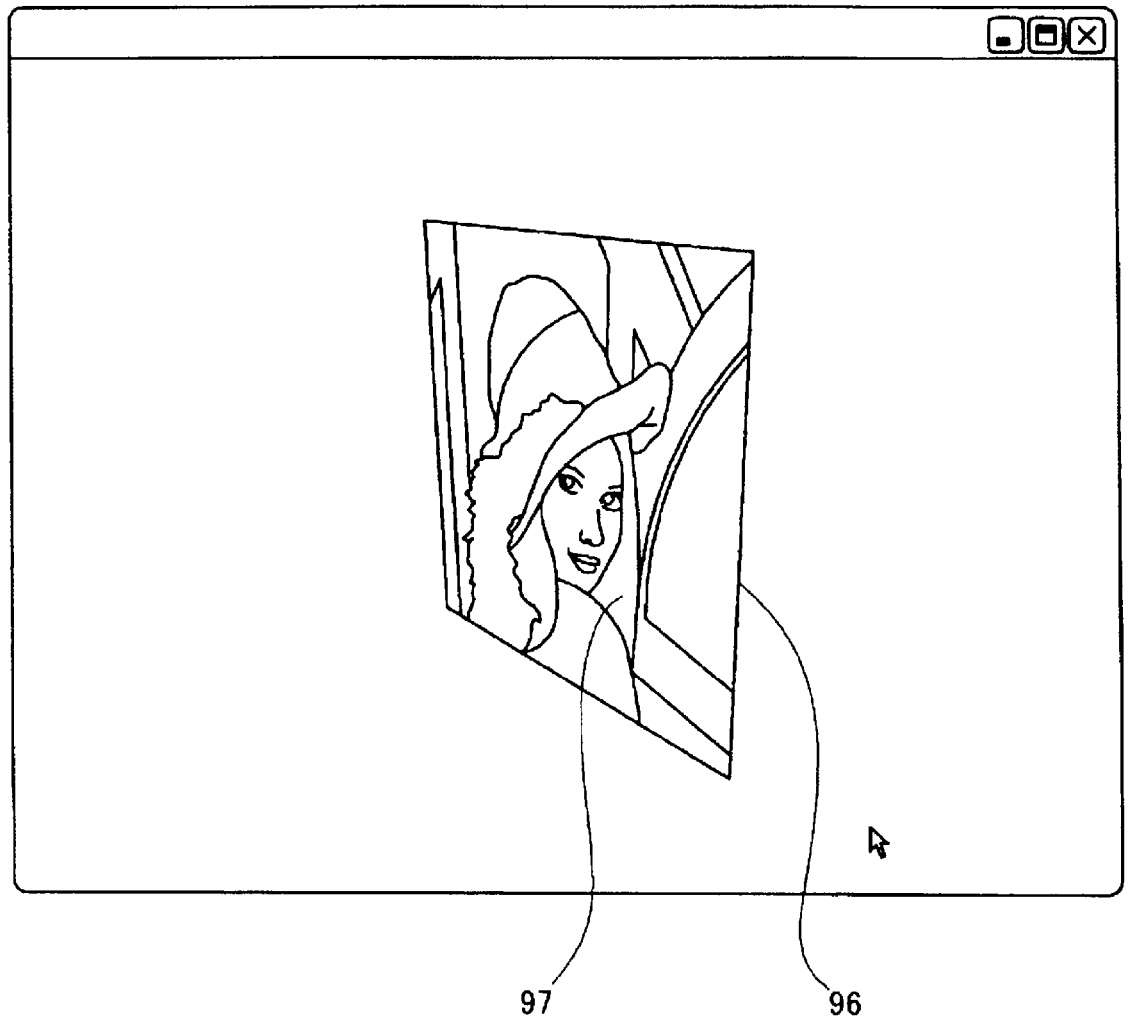
FIG. 6 is a schematic diagram of one example of an image rendered by a rendering unit in FIG. 1.

FIG. 6 shows one example of the image rendered by the rendering unit 75. In FIG. 6, a texture 97 created from the image (processed by the first image processor 50) is mapped onto a surface of a polygon 96 having a plate shape. Actually, a rendered image shown in FIG. 6 is displayed on the display unit 85.

In the rendering module, a relationship between the CG model and the texture, and contents of shader processing by a programmable shader, are stored. Furthermore, the rendering module used for rendering processing by the rendering unit 75, and the secure rendering module, may be defined as a table, or may be selected by a user. The display control unit 80 displays the image (rendered by the rendering unit 75) on the display unit 85. The display unit 85 is realized by a liquid crystal display.

Figure 7:
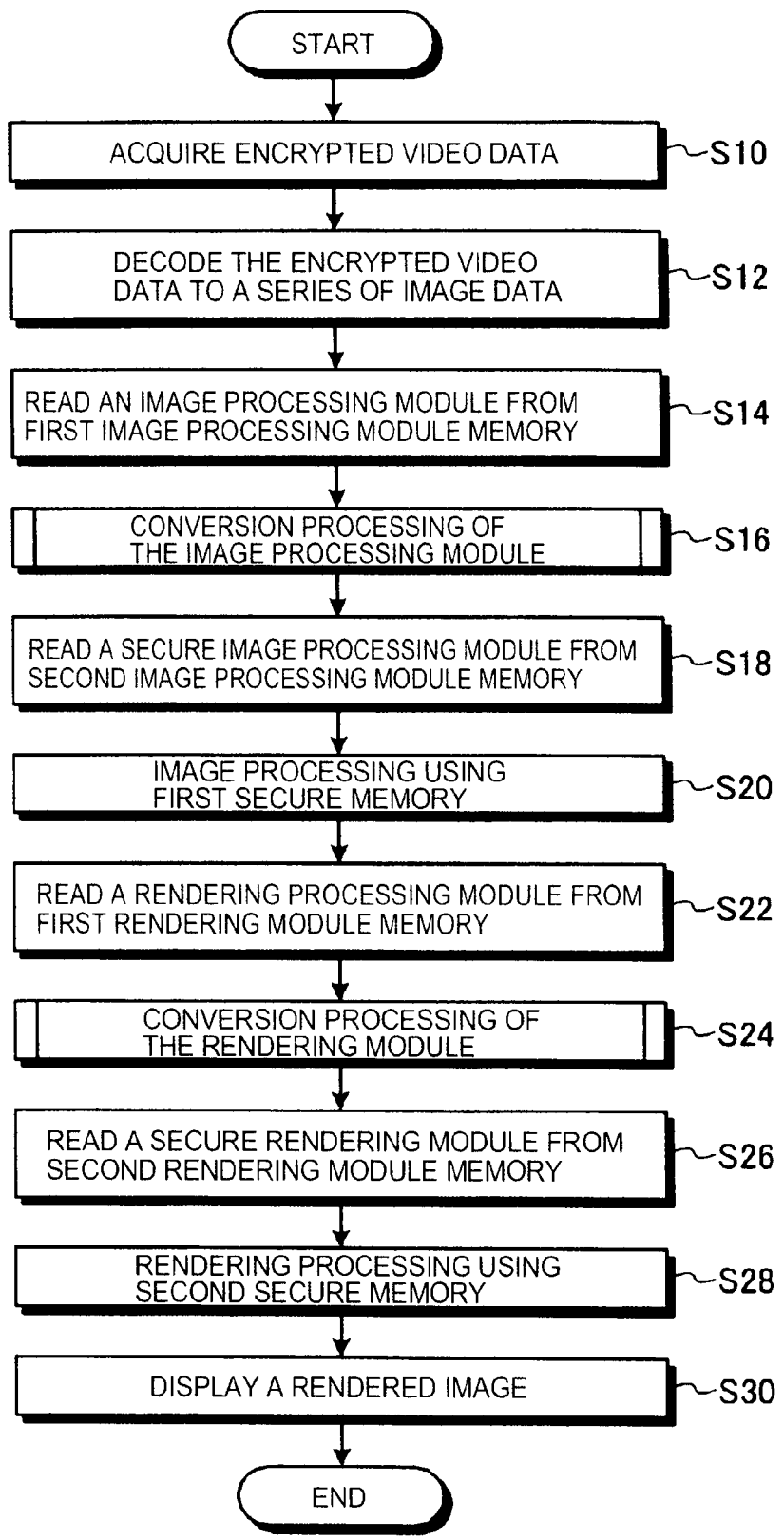
FIG. 7 is a flow chart of processing of the image processing apparatus according to the first embodiment.

Next, operation of the image processing apparatus of the first embodiment is explained. FIG. 7 is a flow chart of processing of the image processing apparatus 1 of the first embodiment.

First, the first acquisition unit 20 acquires encrypted video data from the first tuner 10 or the encrypted broadcast data memory 15 (S10). Next, the decryption unit 25 decrypts the video data (acquired by the first acquisition unit 20) as a series of image data (S12). The first converter 40 reads an image processing module from the first image processing module memory 35 (S14), and converts the image processing module (S16). Detail processing of conversion of the image processing module is explained afterwards.

Next, the first image processor 50 reads a secure image processing module from the second image processing module memory 45 (S18). By using the image processing module (converted by the first converter 40) and the secure image processing module, the first image processor 50 executes image processing of decrypted image data (by the decryption unit 25) by accessing the first secure memory 31 (S20).

Next, the second converter 65 reads a rendering module from the first rendering module memory 60 (S22), and converts the rendering module (S24). The conversion processing of the rendering module is same as conversion processing of the image processing module. Accordingly, this explanation is omitted.

Next, the rendering unit 75 reads a secure rendering module from the second rendering module memory 70 (S26). By using the rendering module (converted by the second converter 65) and the secure rendering module, the rendering unit 75 renders image data (processed by the first image processor 50) by accessing the second secure memory 56 (S28). The display control unit 80 displays the image (rendered by the rendering unit 75) on the display unit 85 (S30).

Figure 8:
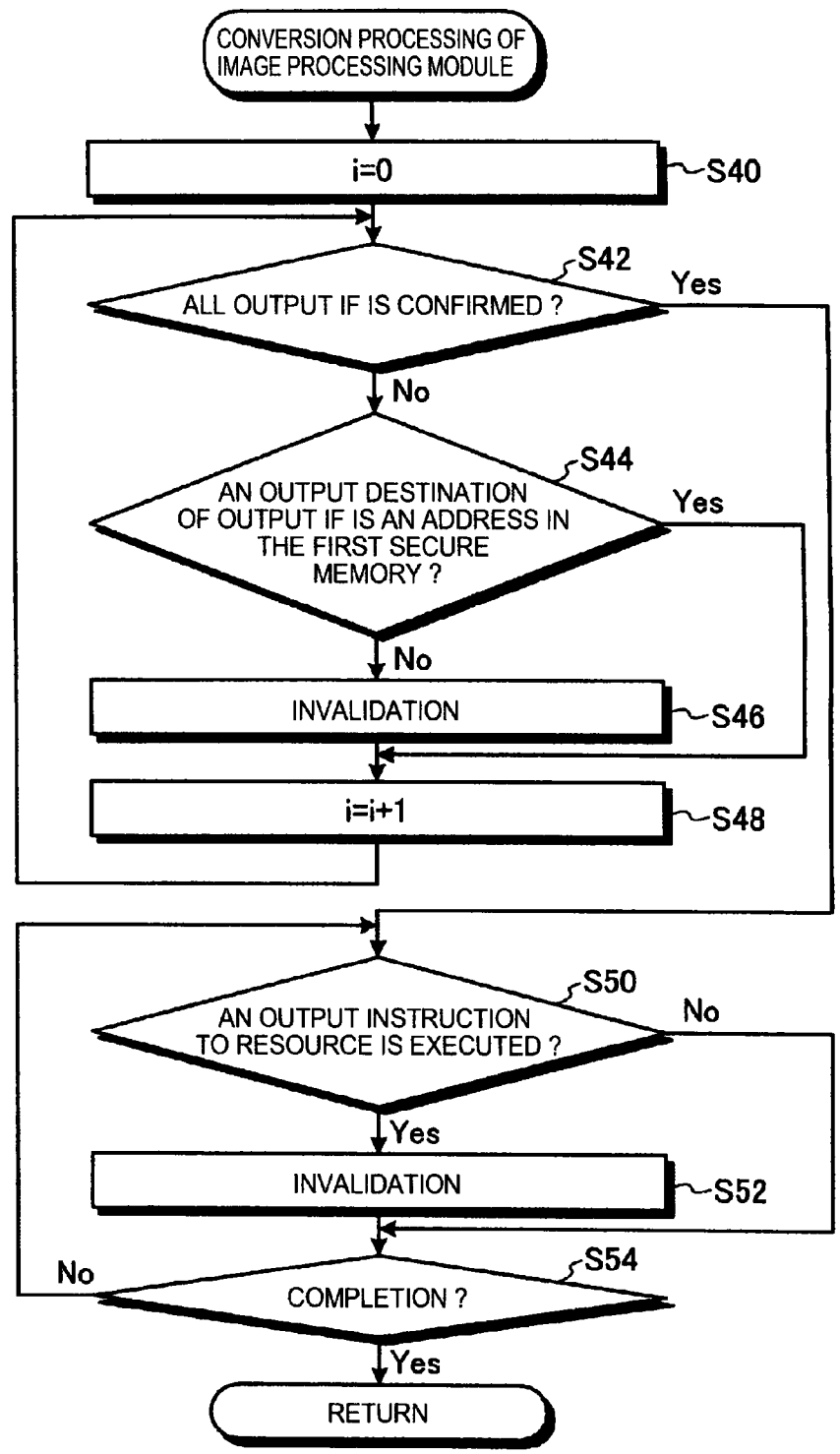
FIG. 8 is a flow chart of processing of S16 in FIG. 7.

FIG. 8 is a flow chart of detail steps of the conversion processing of the image processing module at S16 in FIG. 7. First, the first converter 40 initializes a variable "i" by substituting "0" for "i" (S40). If confirmation of all output IF is not completed (No at S42), the first converter 40 confirms whether an address of an output destination of an output IFi is an address in the first secure memory 31 (S44). If the address of the output destination of the output IFi is not the address in the first secure memory 31 (No at S44), the first converter 40 invalidates an output of data from the output IFi (S46). If the address of the output destination of the output IFi is the address in the first secure memory 31 (Yes at S44), the first converter 40 do not execute processing of S46.

Next, the first converter 40 increases the variable "i" by "1" (S48). If confirmation of all output IF is completed (Yes at S42), the first converter 40 confirms whether an output instruction to the resource 94 is executed (S50). If the output instruction to the resource 94 is executed (Yes at S50), the first converter 40 invalidates the output instruction (S52). If the output instruction to the resource 94 is not executed (No at S50), the first converter 40 does not execute invalidate processing.

If all output instructions to the resource 94 are invalidated, the first converter 40 completes processing (Yes at S54). If at least one of all output instructions to the resource 94 is not invalidated, the first converter 40 executes processing of S50 (No at S54).

As mentioned-above, in the first embodiment, as to an image processing module read from the first image processing module memory 35 (arbitrary image processing module is permitted to be registered), the first converter 40 decides whether the image processing module includes an output processing to the outside of the first secure memory 31. If the image processing module includes the output processing, the first converter 40 invalidates the output processing in the image processing module.

In the same way, as to a rendering module read from the first rendering module memory 60 (arbitrary rendering module is permitted to be registered), the second converter 65 decides whether the rendering module includes an output processing to the outside of the second secure memory 56. If the rendering module includes the output processing, the second converter 65 invalidates the output processing in the rendering module.

Accordingly, in the first embodiment, various image processing and various rendering processing can be realized while maintaining the security of image data. Even if the third party bearing malice registers a processing module harming the security into the first image processing module memory 35 or the first rendering module memory 60, the security of the image data can be maintained.

The Second Embodiment

In the second embodiment, non-encrypted image data is further acquired, the non-encrypted image data is subjected to image processing, and the image data processed is rendered. Hereinafter, a point of difference between the second embodiment and the first embodiment is mainly explained. As to component units having the same function as the first embodiment, the same name/sign as the first embodiment are assigned, and its explanation is omitted.

Figure 9:
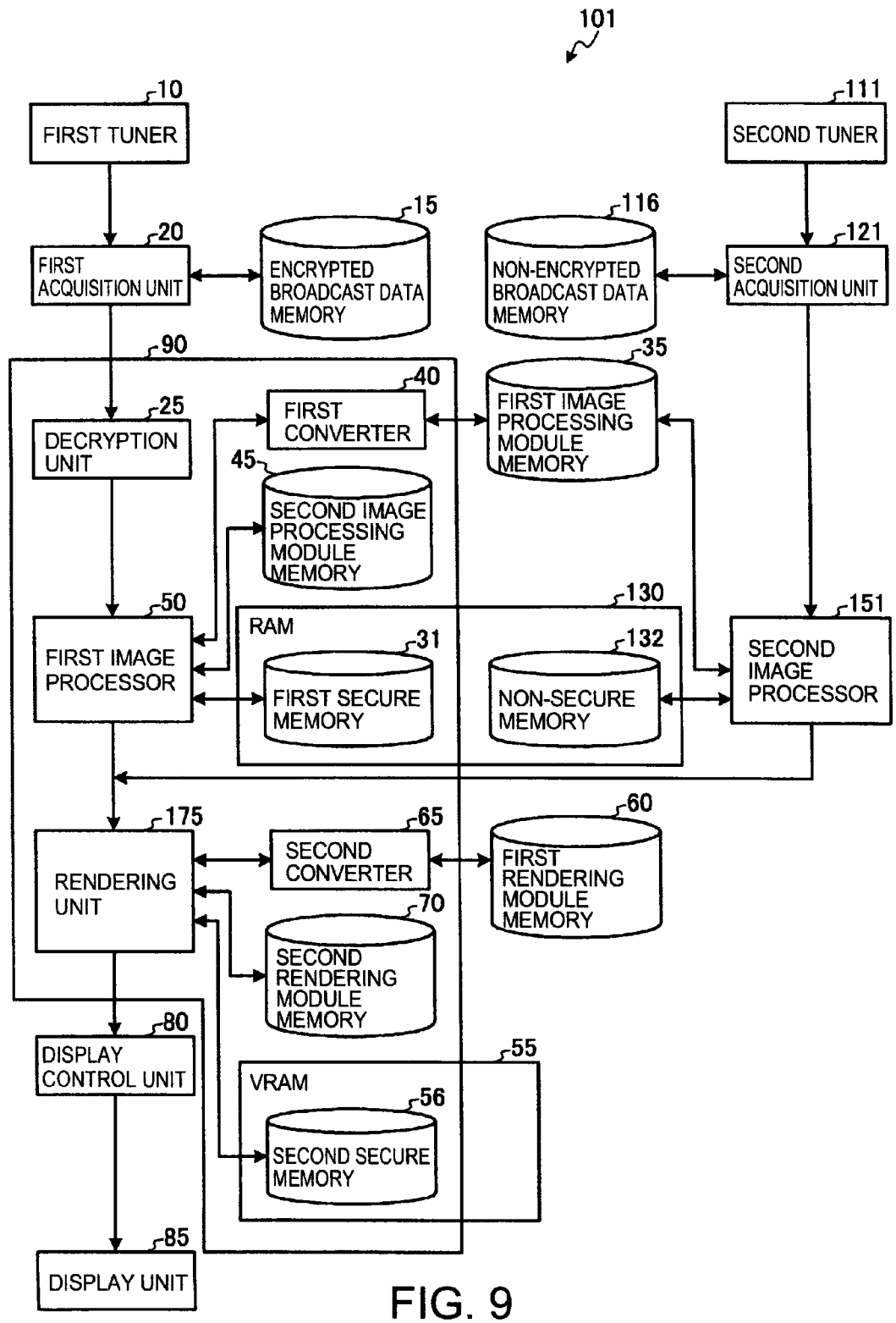
FIG. 9 is a block diagram of an image processing apparatus according to a second embodiment.

First, component of the image processing apparatus of the second embodiment is explained. FIG. 9 is a block diagram of the image processing apparatus 101 of the second embodiment. In the image processing apparatus 101, a second tuner 111, a non-encrypted broadcast data memory 116, a second acquisition unit 121, a non-secure memory 132, and a second image processor 151, are not included in the image processing apparatus 1 of the first embodiment. Furthermore, processing of the rendering unit 175 is different from that of the first embodiment. Accordingly, these units are only explained.

The second tuner receives a non-encrypted broadcast, and outputs the broadcast as a video/sound signal. In this case, "non-encrypted broadcast" is a broadcast (DRM (Digital Rights Management) technique is not applied) accessible by a user (viewer) for original data of the broadcast. For example, the non-encrypted broadcast corresponds to a public wave broadcast such as analog terrestrial television broadcasting.

In a broadcast received by the second tuner 111, the non-encrypted broadcast data memory 116 stores a video/sound signal of the broadcast recorded by the image processing apparatus 101. In the same way as the encrypted broadcast data memory 15, the non-encrypted broadcast data memory 115 is realized as an existing memory medium such as the HDD.

The second acquisition unit 121 acquires video data (video signal) from the second tuner 111 or the non-encrypted broadcast data memory 116, as a series of image data. In this case, the second acquisition unit 121 may acquire video data or image data personally taken by the user.

The non-secure memory 132 is a part of a storage region of the RAM 130, which an access from the outside is not restricted. Accordingly, the non-secure memory 132 is not included in the area 90. The non-secure memory 132 stores video data acquired by the second acquisition unit 121 as a series of image data. Image processing by the second image processor 151 (explained afterwards) is executed using the non-secure memory 132. In the non-secure memory 132, information (attribute such as a color of each pixel) of image data of each frame comprising the video data (acquired by the second acquisition unit 121), and relationship among frames, are stored.

The second image processor 151 reads an image processing module from the first image processing module memory 35. By using the image processing module, the second image processor 151 executes image processing of image data (acquired by the second acquisition unit 121) by accessing the non-secure memory 132. The image processing module used for image processing by the second image processor 151 may be defined as a table or may be selected by the user.

By using the rendering module converted by the second converter 65, the rendering unit 175 renders image data (processed by the second image processor 151) by accessing the second secure memory 56.

Figure 10:
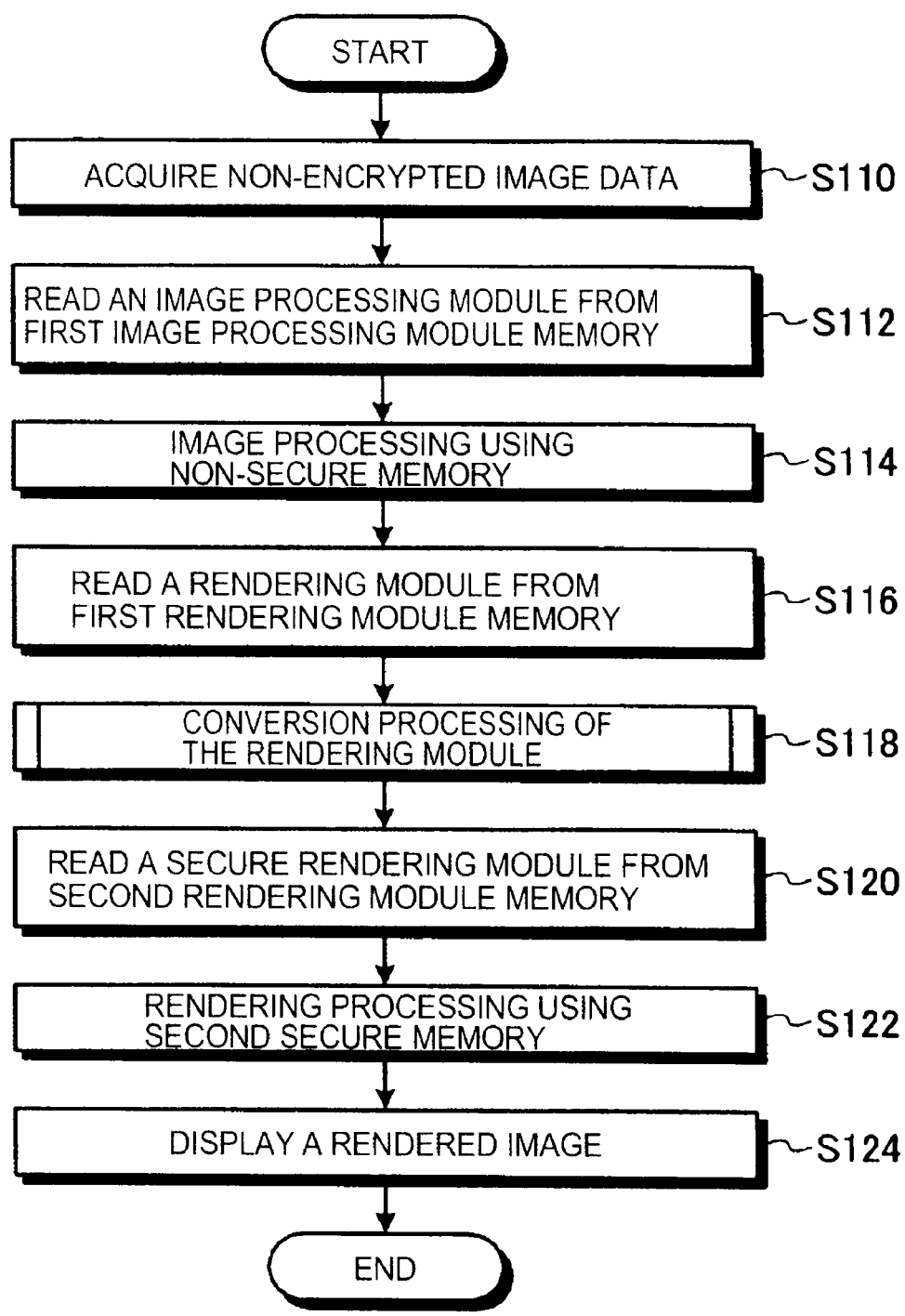
FIG. 10 is a flow chart of processing of the image processing apparatus according to the second embodiment.

Next, operation of the image processing apparatus of the second embodiment is explained. FIG. 10 is a flow chart of processing of the image processing apparatus 101 of the second embodiment. In an example shown in FIG. 10, the rendering unit 175 renders only image data processed by the second image processor 151. Furthermore, the rendering unit 175 can render image data processed by the first image processor 50.

First, the second acquisition unit 121 acquires video data from the second tuner 111 or the non-encrypted broadcast data memory 116 as a series of image data (S110). Next, the second image processor 151 reads an image processing module from the first image processing module memory 35 (S112). By using the image processing module, the second image processor 151 executes image processing of the image data (acquired by the second acquisition unit 121) by accessing the non-secure memory 132 (S114).

Processing following from S116 is same as processing following from S22 in FIG. 7, except for rendering of image data (processed by the second image processor 151) by the rendering unit 175. Accordingly, its explanation is omitted.

As mentioned-above, in the second embodiment, as to image data which the security is not necessary, the second image processor 151 processes the image data using an image processing module (read from the first image processing module memory 35) without conversion of the image processing module (by the first converter 40).

Accordingly, in the second embodiment, the second image processor 151 can execute all processing contents defined in the image processing module, i.e., more various image processing can be realized. Especially, even if a processing module is not created by the third party bearing malice, when the processing module accesses an outside storage region of the first secure memory 31 during processing, the second image processor 151 can use the processing module as it is.

The Third Embodiment

In the third embodiment, a processing module used by the first image processor and the rendering unit is selected by a user. Hereinafter, a point of difference between the third embodiment and the first embodiment is mainly explained. As to component units having the same function as the first embodiment, the same name/sign as the first embodiment are assigned, and its explanation is omitted.

Figure 11:
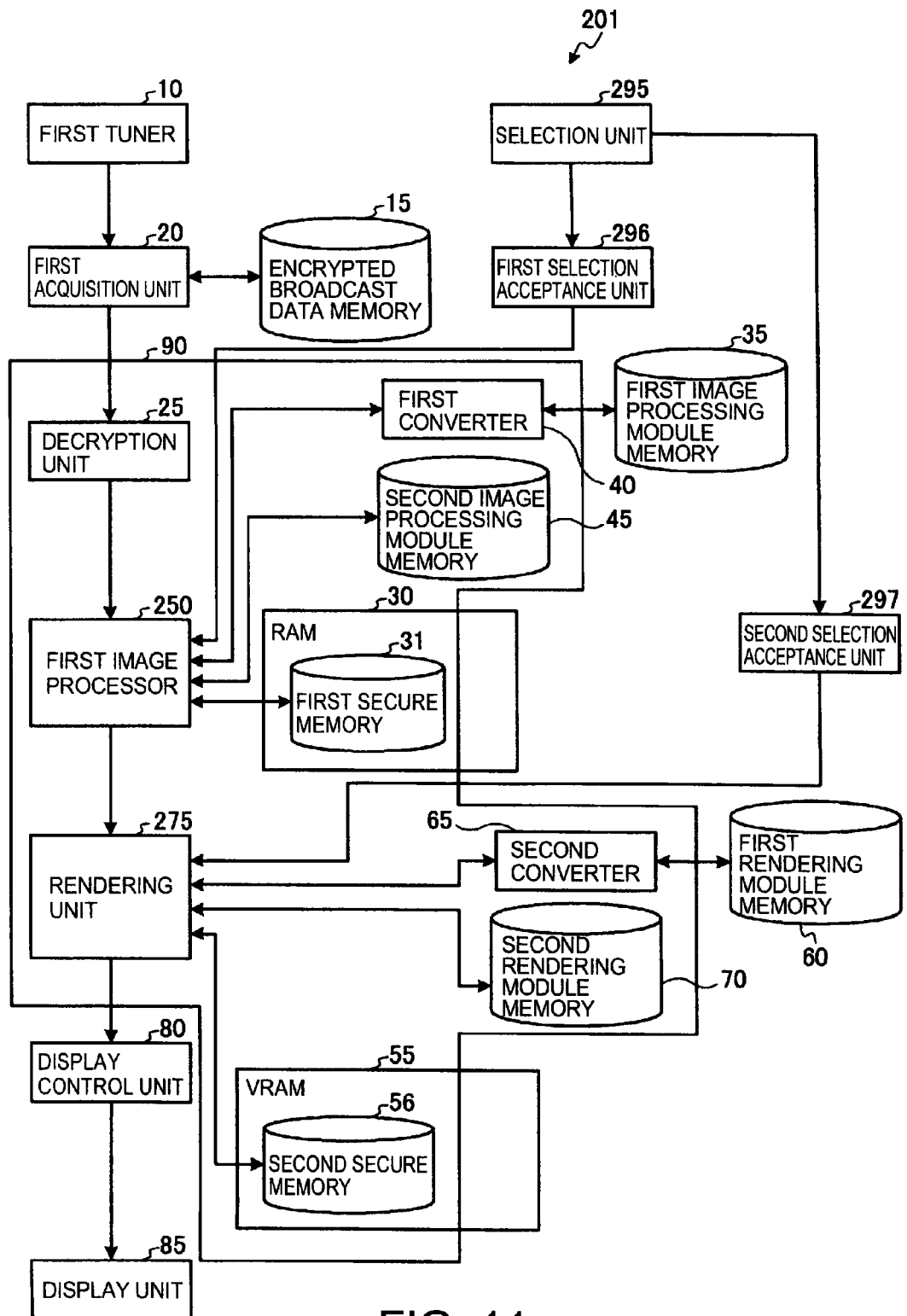
FIG. 11 is a block diagram of an image processing apparatus according to a third embodiment.

First, component of the image processing apparatus of the third embodiment is explained. FIG. 11 is a block diagram of the image processing apparatus 201 of the third embodiment. In the image processing apparatus 201, a selection unit 201, a first selection acceptance unit 296, and a second selection acceptance unit 297, are not included in the image processing apparatus 1 of the first embodiment. Furthermore, processing of the first image processor 250 and the rendering unit 275 are different from those of the image processing apparatus 1 of the first embodiment. Accordingly, functions of these units are only explained.

The selection unit 295 performs a selection operation of various kinds of processing modules. For example, the selection unit 295 is realized as an existing input apparatus such as a keyboard, a key switch, or a touch panel. A user or a developer selects a processing module from various kinds of processing modules using the selection unit 295, while watching a module selection screen displayed on the display unit 85 (by the display control unit 80).

The first selection acceptance unit 296 accepts selection of the image processing module and the secure image processing module (used for image processing by the first image processor 250). The second selection acceptance unit 297 accepts selection of the rendering module and the secure rendering module (used for rendering by the rendering unit 275).

By using the image processing module and the secure image processing module (selection is accepted by the first selection acceptance unit 296), the first image processor 250 executes image processing of image data (decrypted by the decryption unit 25) in order of processing, by accessing the first secure memory 31. In this case, as mentioned-above, the first converter 40 converts the image processing module.

By using the rendering module and the secure rendering module selected (accepted by the second selection acceptance unit 297), the rendering unit 275 renders image data (processed by the first image processor 250) in order of processing, by accessing the second secure memory 56. In this case, as mentioned-above, the second converter 65 converts the rendering module.

Figure 12:
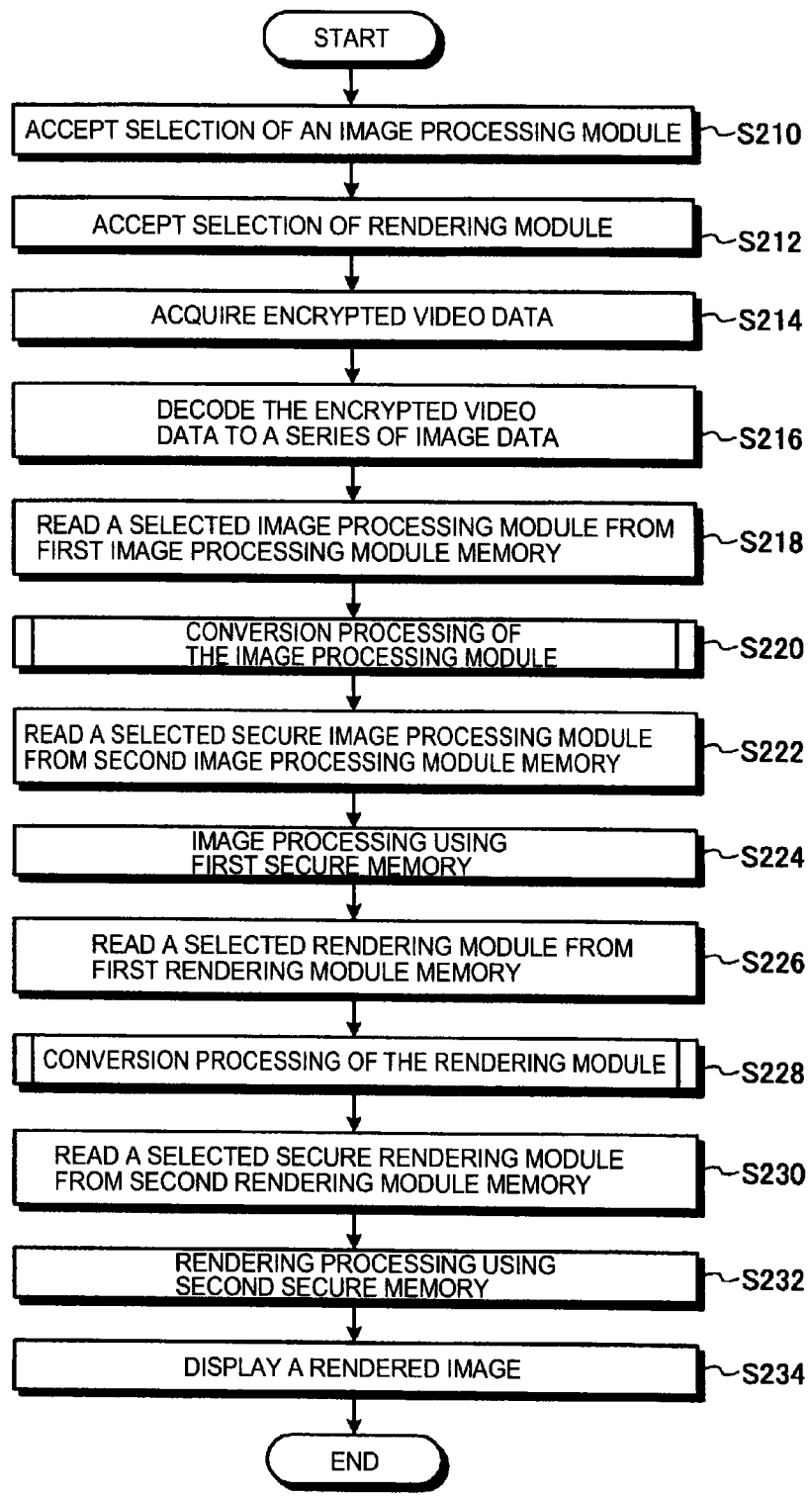
FIG. 12 is a flow chart of processing of the image processing apparatus according to the third embodiment.

Next, operation of the image processing apparatus of the third embodiment is explained. FIG. 12 is a flow chart of processing of the image processing apparatus 301 of the third embodiment.

First, the first selection acceptance unit 296 accepts selection of the image processing module and the secure image processing module, which are used for image processing by the first image processor 250 (S210). Next, the second selection acceptance unit 297 accepts selection of the rendering module and the secure rendering module, which are used for rendering by the rendering unit 275 (S212).

Continually, processing from acquisition of video data to decryption of the video data (S214-S216) is same as processing from S10 to S12 in FIG. 7. Accordingly, this explanation is omitted.

According to an indication from the first image processor 250, the first converter 40 reads an image processing module selected (accepted by the first selection acceptance unit 296) from the first image processing module memory 35 (S218), and converts the image processing module (S220). The conversion processing of the image processing module is same as that of the first embodiment. Accordingly, its explanation is omitted.

Next, the first image processor 250 reads a secure image processing module selected (accepted by the first selection acceptance unit 296) from the second image processing module memory 45 (S222). Continually, image processing (S224) is same as processing of S20 in FIG. 7. Accordingly, its explanation is omitted.

Next, according to an indication from the rendering unit 275, the second converter 65 reads a rendering module selected (accepted by the second selection acceptance unit 297) from the first rendering module memory 60 (S226), and converts the rendering module (S228). The conversion processing of the rendering module is same as that of the first embodiment. Accordingly, its explanation is omitted.

Next, the rendering unit 275 reads a secure rendering module selected (accepted by the second selection acceptance unit 297) from the second rendering module memory 70 (S230). Processing following from S232 is same as processing following from S28 in FIG. 7. Accordingly, its explanation is omitted.

As mentioned-above, in the third embodiment, the image processing and the rendering processing are executed using the processing module selected by the user or the developer. As a result, an efficiency of maintenance/development for the image processing apparatus rises.

(Modifications)

In above-mentioned embodiments, a method to maintain the security of video/image data in broadcast data is explained. However, the same method can be applied to speech data (speech signal). Furthermore, above-mentioned embodiments may be combined. For example, by combining the second and third embodiments, a processing module used by the second image processor may be selected by a user.

Figure 13:
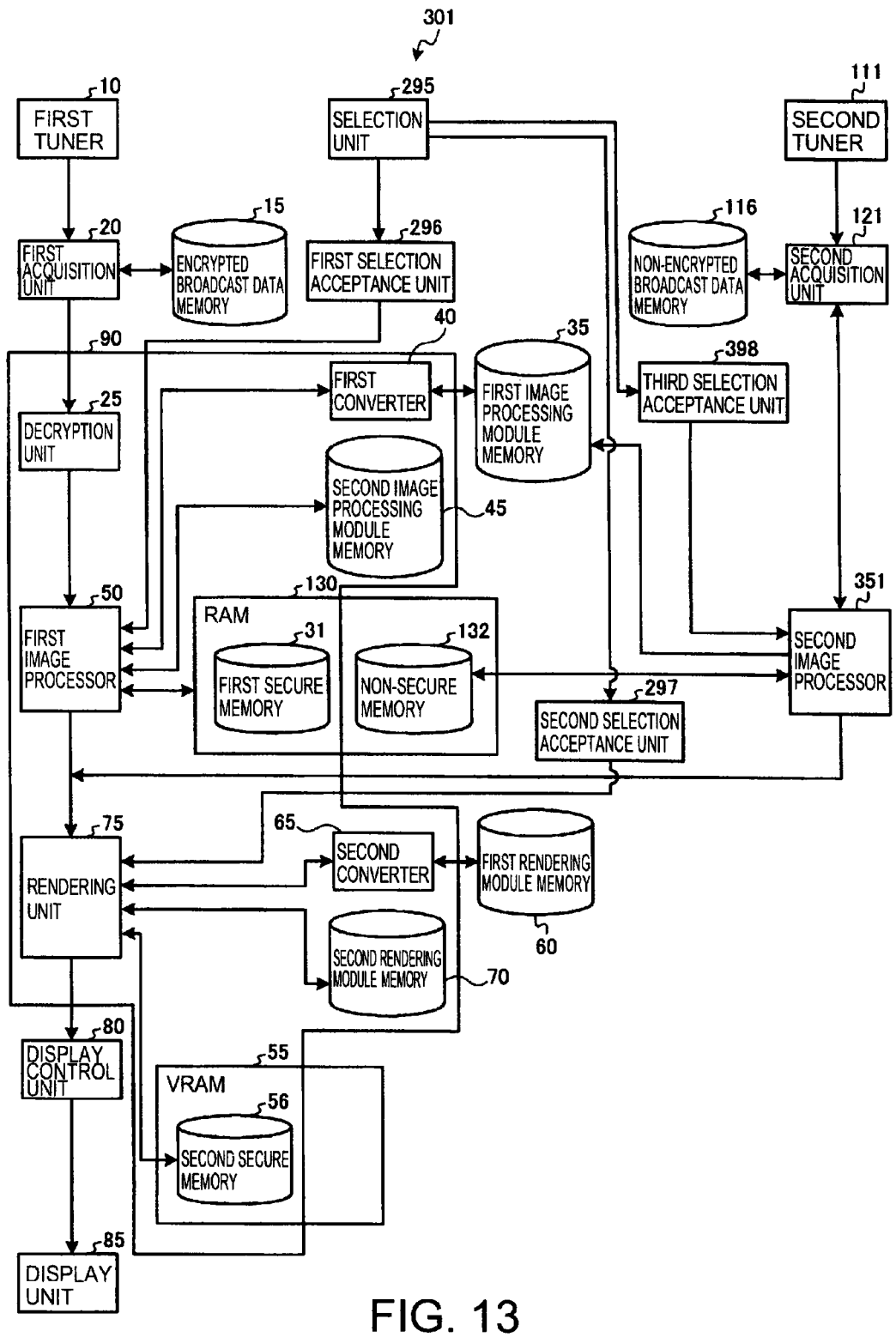
FIG. 13 is a block diagram of an image processing apparatus according to a modification.

FIG. 13 is a block diagram of an image processing apparatus 301 as a combination of the second and third embodiments. In the image processing apparatus 301, a third selection acceptance unit 398 is not included in the second third embodiments, and processing of the second image processor 351 is different from the second and third embodiments. Accordingly, functions of these units are explained.

Hereinafter, a point of difference from the second and third embodiments is mainly explained. As to component units having the same function as the second and third embodiments, the same name/sign as the second and third embodiments are assigned, and its explanation is omitted.

The third selection acceptance unit 398 accepts selection of an image processing module used for image processing by the second image processor 351. By using the image processing module selected (accepted by the third selection acceptance unit 398), the second image processor executes image processing of image data (acquired by the second acquisition unit 121) in order of processing, by accessing the non-secure memory 132.

In above-mentioned embodiments, the image processing apparatus 1, 101, 201 and 301 has a hardware component preparing a control apparatus (CPU, GPU), a storage apparatus (ROM, RAM), a display apparatus (liquid crystal display), an input apparatus (touch panel, operation button), a sound output apparatus (speaker), and a tuner.

In the disclosed embodiments, the processing can be performed by a computer program stored in a computer-readable medium.

In the embodiments, the computer readable medium may be, for example, a magnetic disk, a flexible disk, a hard disk, an optical disk (e.g., CD-ROM, CD-R, DVD), an optical magnetic disk (e.g., MD). However, any computer readable medium, which is configured to store a computer program for causing a computer to perform the processing described above, may be used.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device.

A computer may execute each processing stage of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and so on. In short, the equipment and the apparatus that can execute the functions in embodiments using the program are generally called the computer.

Other embodiments of the invention will be apparent to those skilled in the art from consideration of the specification and embodiments of the invention disclosed herein. It is intended that the specification and embodiments be considered as exemplary only, with the scope and spirit of the invention being indicated by the claims.

What is claimed is:

1. An apparatus for processing an image, comprising:
a first acquisition device to acquire encrypted video data;
a decryption device to decrypt the encrypted video data as first image data;
a first secure memory to restrict an access from an outside of the apparatus to the first secure memory;
a first image processing module memory to store a first image processing module used for executing image processing;
a first converter to decide whether the first image processing module includes an output processing to an outside of the first secure memory, and, when the first image processing module includes the output processing, converts the first image processing module to a second image processing module including the output processing invalidated;
a first processor to process the first image data using the second image processing module, by accessing the first secure memory, and generate second image data;
a second secure memory to restrict an access from the outside of the apparatus to the second secure memory;
a first rendering module memory to store a first rendering module used for executing rendering processing;
a second converter to decide whether the first rendering module includes an output processing to an outside of the second secure memory, and, when the first rendering module includes the output processing, converts the first rendering module to a second rendering module including the output processing invalidated;
a rendering device to render the second image data using the second rendering module, by accessing the second secure memory; and
a display device to display the second image data rendered; and wherein, when an address of output destination of data from the first image processing module is not an address in the first secure memory, the first converter decides that the first image processing module includes the output processing to the outside of the first secure memory; and
wherein the converting the first image processing module to a second image processing module includes the first converter initializing a variable "i" by substituting a value for "i" and if a confirmation of all output IF (interface) is not completed, the first converter confirms whether an address of an output destination of an output IFi is an address in the first secure memory,
incrementing the variable "i" when the address of the output destination of the output IFi is the address in the first secure memory and the first converter repeats process of confirming the output IF; and
if the address of the output destination of the output IFi is not the address in the first secure memory, the first converter invalidates an output of data from the output IFi.

2. The apparatus according to claim 1, wherein,
when the first image processing module includes an output instruction to at least one of an output apparatus and a storage apparatus,
the first converter decides that the first image processing module includes the output processing to the outside of the first secure memory.

3. The apparatus according to claim 1, wherein,
when an address of output destination of data from the first rendering module is not an address in the second secure memory,
the second converter decides that the first rendering module includes the output processing to the outside of the second secure memory.

4. The apparatus according to claim 1, wherein,
when the first rendering module includes an output instruction to at least one of an output apparatus and a storage apparatus,
the second converter decides that the first rendering module includes the output processing to the outside of the second secure memory.

5. The apparatus according to claim 1, further comprising:
a second image processing module memory to store a secure image processing module not including the output processing to the outside of the first secure memory; and a second rendering module memory to store a secure rendering module not including the output processing to the outside of the second secure memory;

wherein the first processor processes the first image data using the secure image processing module, by accessing the first secure memory, and wherein the rendering device renders the second image data using the secure rendering module, by accessing the second secure memory.

6. The apparatus according to claim 1, further comprising:
a second acquisition device to acquire non-encrypted image data;
a non-secure memory to store non-secure data, an access from the outside of the apparatus to the non-secure memory being not restricted; and
a second processor to process the non-encrypted image data using the first image processing module, by accessing the non-secure memory, and generate third image data;
wherein the rendering device renders the third image data by accessing the second secure memory.

7. The apparatus according to claim 6, further comprising:
a third selection acceptance device to accept a selection of the first image processing module to be used by the second processor;
wherein the first processor reads the first image processing module selected from the first image processing module memory, and processes the non-encrypted image data using the first image processing module, by accessing the non-secure memory.

8. The apparatus according to claim 1, further comprising:
a first selection acceptance device to accept a selection of the first image processing module to be used by the first processor;
a second selection acceptance device to accept a selection of the first rendering module to be used by the rendering device;
wherein the first converter reads the first image processing module selected from the first image processing module memory, decides whether the first image processing module includes the output processing to the outside of the first secure memory, and, when the first image processing module includes the output processing, converts the first image processing module to the second image processing module including the output processing invalidated; and
wherein the second converter reads the first rendering module selected from the first rendering module memory, decides whether the first rendering module includes the output processing to the outside of the second secure memory, and, when the first rendering module includes the output processing, converts the first rendering module to the second rendering module including the output processing invalidated.

9. The apparatus according to claim 1, further comprising:
a first selection acceptance device to accept a selection of the first image processing module and the secure image processing module to be used by the first processor;
a second selection acceptance device to accept a selection of the first rendering module and the secure rendering module to be used by the rendering device;
wherein the first converter reads the first image processing module selected from the first image processing module memory, decides whether the first image processing module includes the output processing to the outside of the first secure memory, and, when the first image processing module includes the output processing, converts the first image processing module to the second image processing module including the output processing invalidated;

wherein the first processor reads the secure image processing module selected from the second image processing module memory, and processes the first image data using the secure image processing module and the second image processing module, by accessing the first secure memory, wherein the second converter reads the first rendering module selected from the first rendering module memory, decides whether the first rendering module includes the output processing to the outside of the second secure memory, and, when the first rendering module includes the output processing, converts the first rendering module to the second rendering module including the output processing invalidated, and wherein the second processor reads the secure rendering module selected from the second rendering module memory, and processes the second image data using the secure rendering module and the second rendering module, by accessing the second secure memory.

10. The apparatus according to claim 1, wherein the second secure memory is a storage region in a VRAM (Video Random Access Memory).

11. A method for processing an image in an apparatus, comprising:
acquiring encrypted video data;
decrypting the encrypted video data as first image data;
reading a first image processing module from a first image processing module memory, the first image processing module being used for executing image processing;
deciding whether the first image processing module includes an output processing to an outside of a first secure memory, an access from an outside of the apparatus to the first source memory is restricted;
converting the first image processing module to a second image processing module including the output processing invalidated, when the first image processing module includes the output processing;
processing the first image data using the second image processing module, by accessing the first secure memory, to generate second image data;
reading a first rendering module from a first rendering module memory, the first rendering module being used for executing rendering processing;
deciding whether the first rendering module includes an output processing to an outside of a second secure memory, an access from the outside of the apparatus to the second secure memory is restricted;
converting the first rendering module to a second rendering module including the output processing invalidated, when the first rendering module includes the output processing;
rendering the second image data using the second rendering module, by accessing the second secure memory; and
displaying the second image data rendered;
wherein, the deciding decides whether the first image processing module includes an output processing to an outside of a first secure memory, and when an address of output destination of data from the first image processing module is not an address in the first secure memory, the deciding decides that the first image processing module includes the output processing to the outside of the first secure memory; and wherein the converting the first image processing module to a second image processing module includes the first converter initializing a variable "i" by substituting a value for "i" and if a confirmation of all output IF (interface) is not completed, the first converter confirms whether an address of an output destination of an output IFi is an address in the first secure memory, incrementing the variable "i" when the address of the output destination of the output IFi is the address in the first secure memory and the first converter repeats process of confirming the output IF; and if the address of the output destination of the output IFi is not the address in the first secure memory, the first converter invalidates an output of data from the output IFi.

12. A computer program stored in a non-transitory computer readable medium for causing a computer to perform a method for processing an image in an apparatus, the method comprising:

acquiring encrypted video data;

decrypting the encrypted video data as first image data;

reading a first image processing module from a first image processing module memory, the first image processing module being used for executing image processing;

deciding whether the first image processing module includes an output processing to an outside of a first secure memory, an access from an outside of the apparatus to the first secure memory is restricted;

converting the first image processing module to a second image processing module including the output processing invalidated, when the first image processing module includes the output processing;

processing the first image data using the second image processing module, by accessing the first secure memory, to generate second image data;

reading a first rendering module from a first rendering module memory, the first rendering module being used for executing rendering processing;

deciding whether the first rendering module includes an output processing to an outside of a second secure memory, an access from the outside of the apparatus to the second secure memory is restricted;

converting the first rendering module to a second rendering module including the output processing invalidated, when the first rendering module includes the output processing;

rendering the second image data using the second rendering module, by accessing the second secure memory; and displaying the second image data rendered;

wherein, the deciding decides whether the first image processing module includes an output processing to an outside of a first secure memory, and when an address of output destination of data from the first image processing module is not an address in the first secure memory, the deciding decides that the first image processing module includes the output processing to the outside of the first secure memory; and wherein the converting the first image processing module to a second image processing module includes the first converter initializing a variable "i" by substituting a value for "i" and if a confirmation of all output IF (interface) is not completed, the first converter confirms whether an address of an output destination of an output IFi is an address in the first secure memory, incrementing the variable "i" when the address of the output destination of the output IFi is the address in the first secure memory and the first converter repeats process of confirming the output IF; and if the address of the output destination of the output IFi is not the address in the first secure memory, the first converter invalidates an output of data from the output IFi.

* * * * *